United States Patent [19]

Schmidt et al.

[11] Patent Number: 5,301,916

[45] Date of Patent: * Apr. 12, 1994

[54] VEHICULAR MIRROR CLAMPING BRACKET

[76] Inventors: William P. Schmidt, Rockwood; Franklin D. Hutchinson, New Boston, both of Mich.

[*] Notice: The portion of the term of this patent subsequent to Apr. 21, 2009 has been disclaimed.

[21] Appl. No.: 843,508

[22] Filed: Feb. 28, 1992

Related U.S. Application Data

[63] Continuation-in-part of Ser. No. 419,213, Oct. 10, 1989, Pat. No. 5,106,049.

[51] Int. Cl.$^5$ .............................................. B60R 1/00
[52] U.S. Cl. .................................. 248/475.1; 296/152
[58] Field of Search ............ 248/487, 476, 475.1, 248/74.3, 231, 316.5, 534, 539, 540, 541; 24/543, 487; 296/152; 350/606, 631, 632, 634

[56] References Cited

U.S. PATENT DOCUMENTS

| | | | |
|---|---|---|---|
| 3,906,592 | 9/1975 | Sakasogawa et al. | 248/74.3 |
| 4,212,303 | 7/1980 | Nolan | 24/543 X |
| 4,500,063 | 2/1985 | Schmidt et al. | 248/475.1 |
| 4,609,171 | 9/1986 | Matsui | 248/74.3 |
| 5,106,049 | 4/1992 | Schmidt et al. | 248/487 |

Primary Examiner—David L. Talbott
Attorney, Agent, or Firm—Weintraub, DuRoss & Brady

[57] ABSTRACT

A vehicular mirror clamping bracket used for securing mirror assemblies to a vehicle. The clamping bracket is a base and a clamp unit hinged to open and close, thus, permitting a support for a mirror assembly to be inserted into a throughbore within the bracket. The clamp is closed over the mirror assembly support applying torque and thereby holding the support in place. When the clamp is closed, a latch hook on the clamp engages a latch edge in the base thereby locking the clamp closed.

10 Claims, 2 Drawing Sheets

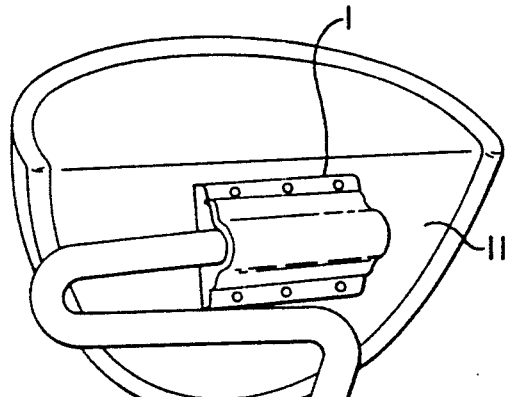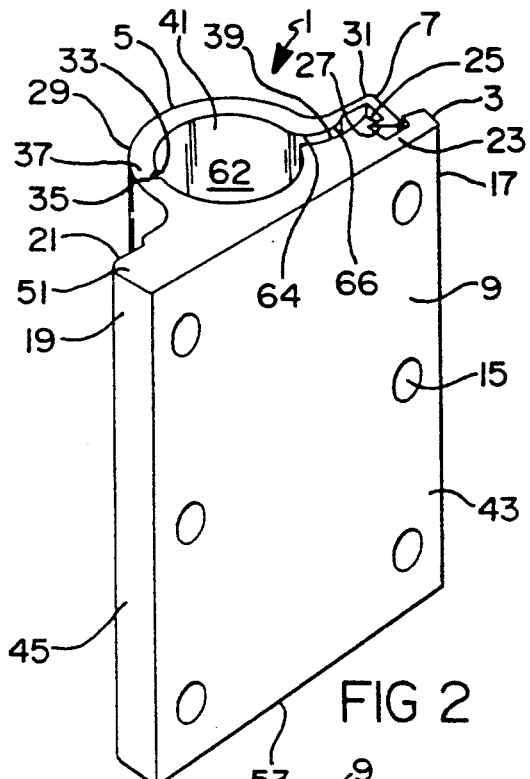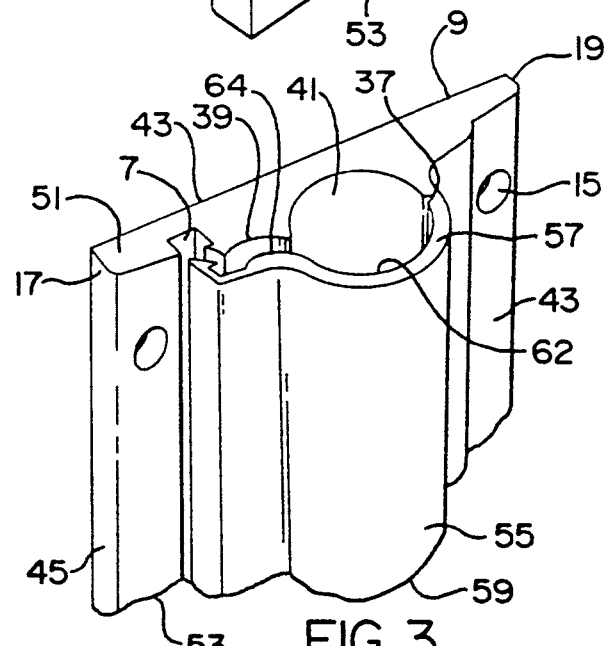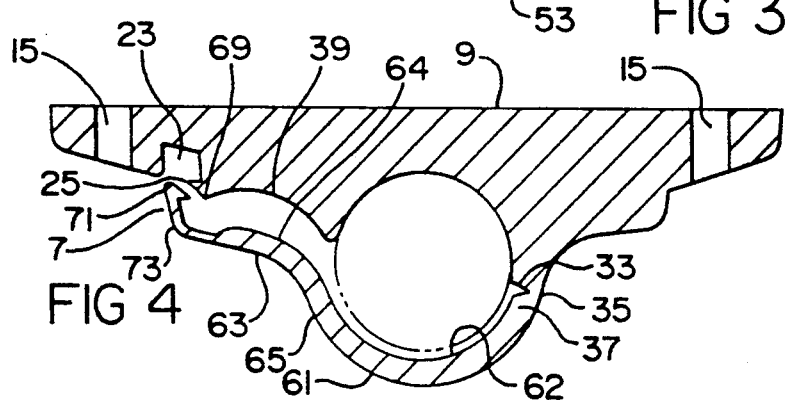

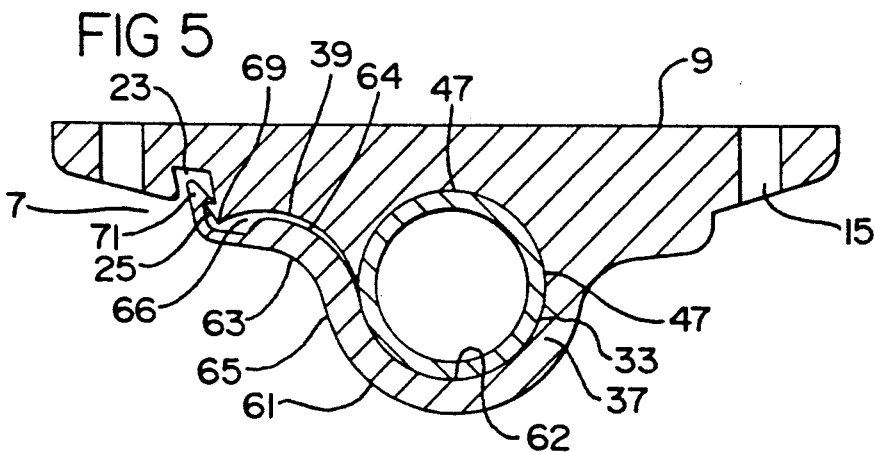
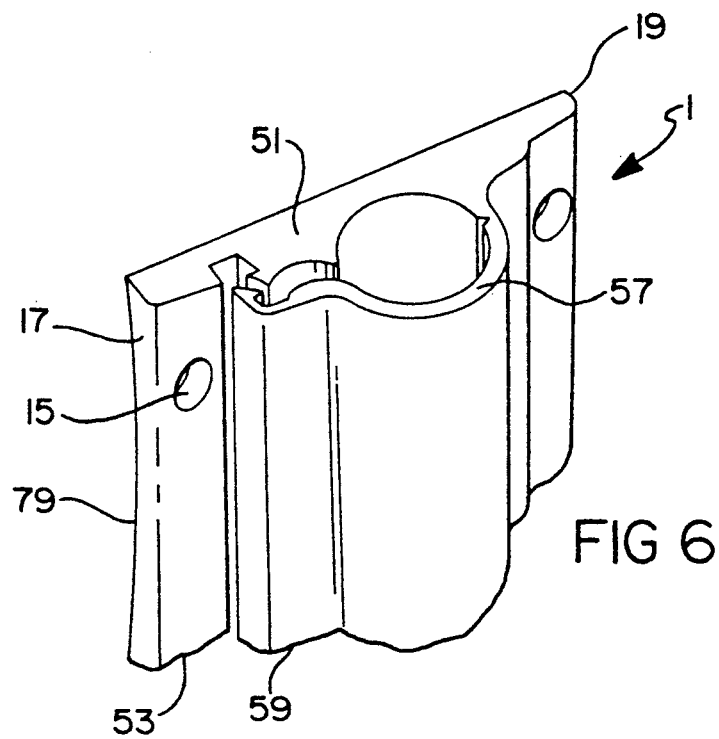
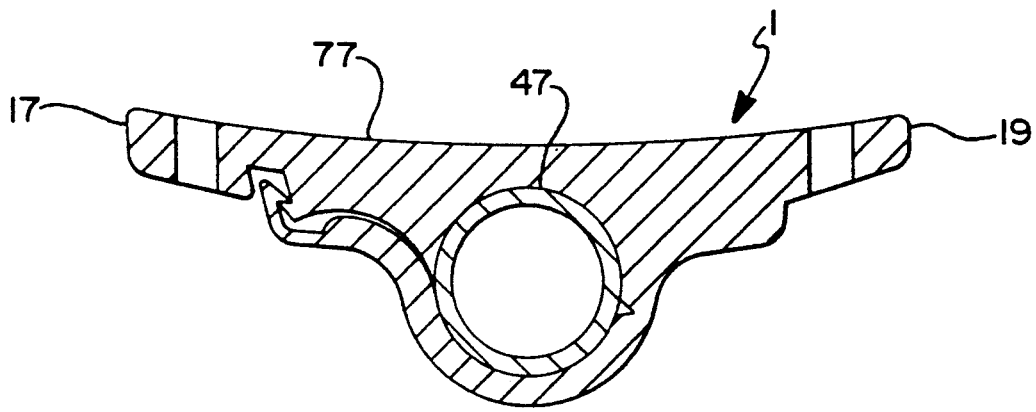

VEHICULAR MIRROR CLAMPING BRACKET

CROSS-REFERENCE TO RELATED APPLICATIONS

This application is a continuation-in-part application of copending U.S. patent application Ser. Nos. 07/419,213, now U.S. Pat. No. 5,106,049 entitled "Vehicular Mounting Assembly", filed Oct. 10, 1989, the disclosure of which is hereby incorporated by reference.

1. Field of the Invention:

The present invention relates to a clamping bracket for securing a mirror assembly to a vehicle.

2. Prior Art:

A vehicle mirror must add to the ability of the vehicle operator to operate the vehicle safely. Therefore, it is generally preferred that the mirrors above the front of the vehicle permit the operator to (1) easily locate the mirror, (2) view objects from in front of the mirrors, and (3) view objects to the side and rear of the vehicle. Numerous mirror mounting supports are known for securing the mirror to the vehicle.

For example, U.S. Pat. No. 1,932,873 issued to Dujardin on Jul. 3, 1934, discloses a support for a rear view mirror positioned on the front of a vehicle which is capable of holding the mirror in position; the mirror having the capability to be adjusted vertically and horizontally. The support directly mounts to the vehicle without any provision to dampen vibrations and eventual disorientation of the mirror adjustment.

U.S. Pat. No. 3,395,883 issued to Murgas on Aug. 6, 1969, discloses a detachable vehicle fender mirror support which is independent of the mirror and mirror support until assembled. The fender support is a tripod attached to a "Y" shaped clamp which attaches to the top inside edge and upper most wheel housing edge of the fender. The design of the fender support makes limited provision for dampening vibrations, does not provide for mirror adjustment, and limits the locations for installing the mirror.

U.S. Pat. No. 4,500,063 issued to Schmidt and Hutchinson on Feb. 19, 1985, discloses a fender mount for a rear view mirror attachable to the front curved corner of the vehicle's fender. The fender mount includes a base attached to the fender and a cover detail which secures the lower portion of the tubular shaft into the base member. This mounting assembly is an improvement over previous methods, but it is limited in its positioning use. Also, it requires periodic tightening to prevent the tubular mirror support shaft from escaping and vibrating.

Another problem with prior art supports is their failure to address vibration. A chronically vibrating mirror reflecting surface of a mirror becomes ineffective and does not aid the operator. The assembly of the mirror is generally elongated to accommodate for the mirror's viewing height, essentially increasing the likelihood of chronic mirror vibration.

It was determined, after filing the copending application referenced above, that the torque being applied to the tubular shaft supporting the mirror by the single mount unit clamping bracket defined therein was being limited by the mating surface between the clamping portion of the bracket and the base portion of the bracket. This application addresses the torque limitation of the bracket.

Furthermore, prior art devices are restrictive in their use and require continuous service to prevent vibrating and unassisted gross movement by the mirror and support shafts. It would be desirable to provide a clamping bracket which is a single detail, usable for clamping the mirror to the support tubular shaft and the mirror assembly to the vehicle; not adjustable by screws, self-torquing of the tubular shaft; capable of rotating adjustment, and not restricted to mounting location on the vehicle.

SUMMARY OF THE INVENTION

The clamping bracket of the present invention is used in combination with vehicle mirror assemblies. The clamping bracket hereof generally comprises:

(a) a base, the base having a latch side and a hinge side;

(b) a clamp, the clamp having a hinge side and a hook side, the hinge side of the clamp being integrally formed with the hinge side of the base;

(c) means for opening and closing the clamp;

(d) means for latching the bracket, such that the clamp can be locked and unlocked;

(e) means for mounting the bracket to a vehicle; and wherein the base and the clamp cooperate to define a unitary member, the unitary member having a throughbore formed therein.

The clamping bracket is designed to receive a mirror assembly support, usually a tubular support, within the throughbore. The tubular support is secured in position when the clamp is latched. A concave channel is formed within the top surface of the base between the means for latching and the throughbore. The channel extends from one end of the bracket to the opposite end. The channel provides a clearance for the clamp to apply torque to the tubular support when latched.

The clamping bracket also provides for optional shapes on the bottom surface of the base. The type of mounting surface dictates the shape of the bottom surface. This allows clamping brackets to be mounted on flat surfaces as well as rounded surfaces.

Other attendant advantages will be more readily appreciated as the same become better understood by reference to the detailed description and considered in connection with the accompanying drawings in which like reference numerals designate like parts throughout the figures, in which:

BRIEF DESCRIPTION OF THE DRAWINGS

FIG. 1 is a perspective view of a mirror mounting assembly incorporating the clamping bracket of the present invention;

FIG. 2 is a perspective view of the base of the present clamping bracket;

FIG. 3 is a perspective view of the clamping bracket, with the clamp in an open position;

FIG. 4 is a sectional view of the clamping bracket, with the clamp in an open position;

FIG. 5 is a sectional view of the clamping bracket with the clamp in a closed position surrounding a tubular support;

FIG. 6 is an end view of an alternative embodiment of the clamping bracket hereof; and FIG. 7 is a side view of another alternative embodiment of the clamping bracket hereof.

DETAILED DESCRIPTION OF THE PREFERRED EMBODIMENTS

Referring now to the drawings and in particular to FIGS. 1-5, there is depicted one embodiment of the vehicular mirror clamping bracket of the instant invention shown, generally, at 1. The vehicular mirror clamping bracket 1 comprises:

(a) a base 3, the base 3 having a hinge side 19 and a latch side 17;

(b) a clamp 5, the clamp 5 having a hinge side 29 and a hook side 31, the hinge side 29 of the clamp 5 being integrally formed with the hinge side 19 of the base 3;

(c) means 37 for opening and closing the clamp 5;

(d) means 7 for latching the bracket 1 such that the clamp 5 can be locked and unlocked;

(e) means for mounting 10 the bracket 1 to a mounting surface 49; and wherein the base 3 and the clamp 5 define a unitary member 43, the unitary member 43 having a throughbore 41 formed therein.

The base 3 of the clamping bracket 1 comprises a mounting member 45 having a first end 51 and a second end 53. The base 3 having at least one aperture 15 on each side 19, 17 of the base 3 for inserting a means for mounting 10 the bracket 1 such as a bolt and nut assembly or the like.

The base 3 further comprises a top surface 21 and a bottom surface 9. The top surface 21 includes a radially shaped concave channel 39 which extends from the first end 51 of the base 3 to the second end 53. The channel 39 is located between the throughbore 41 and the means for latching 7 on the latch side 17 of the top surface 21 of the base 3 and provides the necessary clearance for the clamp 5 to apply torque to a mirror assembly support 47.

The clamp 5 comprises a hinged member 35. The hinged member 35 has a first end 57 and a second end 59. The hinged member includes a convex shaped outside surface 61 from a hinged point 35 to a point 65 opposite the hinge point 35. The surface 61 is concentric with the throughbore 41. The outside surface 61 continues as a concave shaped surface 63 from the opposite point 65 to the hook side 29 of the clamp. The convex shaped 61 and concave shaped 63 outside surfaces extend from the first end 57 of the clamp 5 to the second end 59. Also, as shown in FIGS. 1, 2, 3, 4 and 5, the clamp member 5 also includes an inner surface 62. The inner surface has a radially shaped convex portion 64, proximate the hook member 71 and opposite the outside concave surface 63. The convex portion 64 is seatable within the convex channel 39 when the clamp 5 and base 3 are engaged or locked. The convex portion 64 has a second radius of curvature and the concave channel 39 has a first radius of curvature. The second radius of curvature being different from the first radius curvature. The differences in curvature cause a spacial relationship or clearance space 66 to remain between the convex portion 64 and the concave channel 39 when the clamp 5 is engaged or locked to the base 3.

The means for hinging 37 the clamping bracket 1 comprises a "v" shaped notch 33 formed on the inside surface 62 of the throughbore 41. The "v" notch 33 is located at the hinge point 35 where the hinge side 29 of the clamp integrally connects with the base 3. The "v" notch 33 permits the clamp 5 to be opened and closed, as shown in FIGS. 4 and 5.

The means for latching 7 provides for locking the clamp 5 to the base 3 in a closed position, as shown in FIG. 5. The means for latching 7 comprises: a latching slot 23, formed in the top surface 21 of the base 3. The latching slot 23 is located medially of the clearance channel 39 and the aperture 15 and extends from the first end 51 of the base 3 to the second end 53. The latching slot 23 has a latching edge 25 which partially projects over the slot 23 to provide an edge 25 for the means 7 for latching to engage. The latching edge 25 is integrally formed to the top surface 21 of the base proximate to the edge 69 of the clearance channel 39.

The means 7 for latching further comprises a latch hook 27 which is integrally connected to the clamp 5. The latch hook 27 projects normal from the hook side 31 of the clamp 7 and extends from the first end 57 of the clamp 7 to the second end 59. The latch hook 27 latches under and urges against the latching edge 25 of the base 3 when the clamp 5 is in a closed position, as shown in FIG. 5.

The latch hook 27 includes a hook member 71 and a support member 73. The hook member 71 is wedge shaped and is integrally formed with the support member 73. The hook member extends from the first end 57 of the clamp to the second end 59. The support member 73 is integrally formed with the hook member 71 at one side and the hook side 31 of the clamp 5 at the other side. The support member 73 is an elongated rectangular bar shape extending from the first end 57 of the clamp 5 to the second end 59. The slot 23, latching edge 25 and latch hook 27 cooperate to define the means 7 for latching the clamp 5 to the base 3.

The means for mounting (not shown) comprises a plurality of fasteners, such as a bolt and nut or the like, which fastens the clamping bracket 1 to a vehicle mounting surface 49.

The preferred bottom mounting surface 9 of the mounting member 45 is a flat surface from hinge side 19 of the base 3 to the latch side 17 and from the first end 51 of the base 3 to the second end 53, as shown in FIGS. 1-5.

A second embodiment of the clamping bracket 1, shown in FIG. 6, has a horizontal concave bottom mounting surface 79 which extends from the hinge side 19 of the base 3 to the latch side 17. This embodiment permits the bracket 1 to be mounted to a convex surface.

Another embodiment of the clamping bracket 5 has a vertical concave bottom mounting surface 77 which extends from the first end 31 of the base 3 to the second end 53. This embodiment also permits the clamp bracket 1 to be mounted on a convex surface.

The typical vehicular clamping bracket 1, as illustrated in FIG. 1, is used to assemble a mirror 11 and the tubular support 47 and a fender mounting bracket 13. The clamping bracket 1 clamps the tubular support 47 firmly in place by interconnecting the latch hook 27 with the latch edge 25. The latched clamp 5 maintains a continuous torque on the tubular support without the use of an independent fastening means.

In summary, there has been disclosed a vehicular clamping bracket 1 comprising one piece instead of two, but provides a continuous torque on the tubular support 47 by using a single clamping latch with no adjustment instead of a fastening means that requires constant adjustment. The instant invention can be used in more than one application within the vehicular mirror assembly.

Having, thus, described the invention, what is claimed is:

1. A vehicular mirror clamping bracket for clamping tubular supports, said vehicular clamping bracket comprising:
   (a) a base, the base having a latch side and an hinge side, the base having a radially shaped concave channel formed therein proximate the latch side, the concave channel having a first radius of curvature;
   (b) a clamp, the clamp having a hinge side and a hook side, the hinge side of the clamp being integrally formed with the hinge side of the base, the clamp having a radially shaped convex portion proximate the hook side, the radially shaped convex portion having a second radius of curvature, the second radius being different than the first radius of curvature, the convex portion being seatable within the concave channel;
   (c) means for opening and closing the clamp;
   (d) means for latching the bracket; and
   wherein the base and the clamp cooperate to define a unit, the unit having a throughbore therein and, upon latching the clamp to the base, of the convex portion and the concave channel are in a spaced part relationship such that a continuous torque is maintained on the tubular support.

2. The vehicular clamping bracket of claim 1 wherein the base comprises:
   a first end and a second end, the base having at least one aperture on each side for inserting the means for mounting the bracket.

3. The vehicular clamping bracket of claim 2 wherein the base further comprises:
   a top surface and a bottom surface, the top surface of the base having a convex clearance channel formed therein proximate to the latch side of the base, the channel extending from the first end to the second end; and
   wherein the concave channel defines a clearance space between the base and clamp to apply clamping torque.

4. The vehicle clamping bracket of claim 1 wherein the clamp comprises:
   a hinged member, the hinged member having a first end and a second end, the hinged member having a convex shaped outside surface concentric with the throughbore from the hinge edge of the clamp to a point opposite the hinge end and the hinged member having a concave shaped outside surface continuing from the opposite point to the latch side of the clamp;
   wherein the concave shaped surface and the convex shaped surface extend from the first end of the clamp to the second end.

5. The vehicular clamping bracket of claim 1 wherein the means for hinging the bracket comprises:
   a "v" shaped notch formed within the inside diameter surface of the throughbore, the notch located at the hinge point; and
   wherein the "v" notch defines the hinge for opening and closing the clamp.

6. The vehicular clamping bracket of claim 1 wherein the means for latching comprises:
   (a) a latching slot formed in the top surface of the base, the slot located medially to the clearance channel and the mounting aperture, the slot extending from the first end of the base to the second end;
   (b) a latch edge, the latch edge partially projecting over the slot, the latch edge being wedge shaped and integrally formed with the top surface of the base;
   (c) a latch hook, the latch hook integrally formed with and projecting normal to the clamp, the latch hook comprising:
      (1) a hook member, the hook member being wedge shaped and extending from the first end of the clamp to the second end of the clamp;
      (2) a support member, the support member integrally formed with the hook member at one side and the clamp at the other side, the support member being a rectangular bar shape extending from the first end of the clamp to the second end of the clamp; and
   wherein the slot, latching edge and latch hook define the means for latching the clamp and the base together.

7. The vehicular clamping bracket of claim 1 wherein the means for mounting the bracket to a mounting surface comprises:
   a bolt and nut fastening device insertable within the aperture of the base.

8. The vehicular clamping bracket of claim 1 wherein the base comprises:
   a flat bottom surface from the hinge side to the latch side and from the first end to the second end of the base.

9. The vehicular clamping bracket of claim 1 wherein the base comprises:
   a convex shaped bottom surface from the first end to the second end of the base.

10. The vehicular clamping bracket of claim 1 wherein the base comprises:
   a convex shaped bottom surface from the hinge side to the latch side of the base.

* * * * *